United States Patent
Ryu et al.

(10) Patent No.: US 8,178,253 B2
(45) Date of Patent: May 15, 2012

(54) CURRENT COLLECTOR OF END PLATE FOR FUEL CELL AND METHOD FOR CONTROLLING THE SAME

(75) Inventors: Seong Pil Ryu, Gyeonggi-do (KR); Sun Soon Park, Gyeonggi-do (KR); Nam Woo Lee, Gyeonggi-do (KR); Sang Uk Kwon, Gyeonggi-do (KR); Seo Ho Choi, Seoul (KR); Duck Whan Kim, Seoul (KR)

(73) Assignee: Hyundai Motor Corporation

( * ) Notice: Subject to any disclaimer, the term of this patent is extended or adjusted under 35 U.S.C. 154(b) by 427 days.

(21) Appl. No.: 12/469,925

(22) Filed: May 21, 2009

(65) Prior Publication Data
US 2010/0098977 A1    Apr. 22, 2010

(30) Foreign Application Priority Data
Oct. 21, 2008    (KR) .......................... 10-2008-0103002

(51) Int. Cl.
*H01M 8/04* (2006.01)
(52) U.S. Cl. ........................................ 429/433; 429/517
(58) Field of Classification Search .................. 429/433, 429/517, 459, 461
See application file for complete search history.

(56) References Cited

U.S. PATENT DOCUMENTS

| | | | |
|---|---|---|---|
| 7,323,267 B2 * | 1/2008 | Masel et al. | 429/465 |
| 2004/0151971 A1 * | 8/2004 | Rock | 429/38 |
| 2009/0239128 A1 * | 9/2009 | Keyser et al. | 429/36 |

FOREIGN PATENT DOCUMENTS

| | | |
|---|---|---|
| JP | 2006-024559 | 1/2006 |
| JP | 2006-286454 | 10/2006 |
| JP | 2006-294553 | 10/2006 |
| JP | 2007-026784 | 2/2007 |
| JP | 2007-035410 | 2/2007 |
| KR | 10-2007-0026753 | 3/2007 |
| KR | 10-0747865 | 8/2007 |
| KR | 10-2008-0054008 | 6/2008 |

* cited by examiner

*Primary Examiner* — Hae Moon Hyeon
(74) *Attorney, Agent, or Firm* — Edwards Wildman Palmer LLP; Peter F. Corless

(57) ABSTRACT

The present invention provides a current collector of an end plate for a fuel cell and a method for controlling the same, in which a plurality of current collector plates having different resistance values is mounted on an end plate so that the current of a fuel cell is consumed during cold start and during low power operation to improve cold startability of the fuel cell and, further, the durability of a membrane electrode assembly (MEA) is improved due to an increase in voltage during low power operation.

4 Claims, 8 Drawing Sheets

//<sub>US 8,178,253 B2</sub>//

CURRENT COLLECTOR OF END PLATE FOR FUEL CELL AND METHOD FOR CONTROLLING THE SAME

CROSS-REFERENCE TO RELATED APPLICATION

This application claims under 35 U.S.C. §119(a) the benefit of Korean Patent Application No. 10-2008-0103002 filed Oct. 21, 2008, the entire contents of which are incorporated herein by reference.

BACKGROUND (a) Technical Field

The present disclosure relates to a current collector of an end plate for a fuel cell and a method for controlling the same. More particularly, it relates to a current collector of an end plate for a fuel cell and a method for controlling the same, in which a plurality of current collector plates having different resistance values is preferably mounted on an end plate so that the current of a fuel cell is consumed during cold start and during low power operation to suitably improve cold startability of the fuel cell and, wherein the durability of a membrane electrode assembly (MEA) is suitably improved due to an increase in voltage during low power operation.

(b) Background

The structure of exemplary fuel cell stacks will be described with respect to FIGS. 5 and 6. Preferably, a membrane electrode assembly (MEA) is positioned in the center of each unit cell of the fuel cell stack. The MEA preferably comprises a solid polymer electrolyte membrane 10, through which hydrogen ions (protons) are transported, and catalyst layers including a cathode (air electrode) 12 and an anode (fuel electrode) 14, which are suitably coated on both sides of the electrolyte membrane 10 so that hydrogen reacts with oxygen.

A gas diffusion layer (GDL) 16 and a gasket 18 are sequentially stacked on the outside of the electrolyte membrane 10, i.e., on the outside where the cathode 12 and the anode 14 are respectively positioned. A bipolar plate (also called a separator) 20 including a flow field, through which reactant gases are supplied and water generated by a reaction is discharged, is suitably positioned on the outside of the GDL 16. Preferably, an end plate 30 for supporting and fixing the above-described elements is suitably connected to the outermost surface.

As shown in FIG. 8, an end plate assembly in the fuel cell stack having the above structure preferably comprises an end plate 30 for providing clamping force, an insulating plate 32 for preventing electricity generated in the fuel cell stack from leaking to the outside, a current collector plate 34 for collecting the electricity generated in the fuel cell stack and transmitting it to the outside, and electrodes 35.

Accordingly, as an oxidation reaction of hydrogen takes place at the anode 14 of the fuel cell stack, hydrogen ions (protons) and electrons are produced. The hydrogen ions and electrons are transmitted to the cathode 12 through the electrolyte membrane 10 and the bipolar plate 20, respectively. At the cathode 12, the hydrogen ions and electrons transmitted from the anode 14 react with oxygen in the air supplied to the cathode 12 to produce water by an electrochemical reaction. Accordingly, the electrical energy generated from the flow of electrons is supplied to a load 40 that requires electrical energy through the current collector plate 34 of the end plate assembly.

Conventionally, a single current collector plate, which is an element of the end plate assembly, is suitably formed of a material having a minimum electrical resistance in order to maximize the efficiency of electricity supply from the fuel cell to the load. Preferably, with the use of the current collector plate, it is possible to maximize the electricity efficiency at normal temperature.

When a process of increasing the temperature to an optimum level is required such as for cold start, the temperature of the bipolar plate is suitably reduced as it goes from the center of the fuel cell stack to the end plates at both ends of the fuel cell stack due to the minimum resistance characteristic of the current collector plate, as shown in the graph of FIG. 7. As a result, it takes a considerable amount of time to suitably increase the temperature of the entire system to an optimum level.

U.S. Pat. No. 7,196,492, incorporated by reference in its entirety herein, discloses a technique for improving fuel efficiency by artificially cutting off the connection between a fuel cell and a load during idle and regenerative braking to reduce power consumption in a low efficiency region. Accordingly, an open circuit voltage (OCV) state frequently occurs, which causes a reduction in durability of the MEA, an important element of the fuel cell.

In certain examples, the fuel cell stack has a preferred structure in which unit cells are consecutively arranged, and the consecutively arranged unit cells are electrically connected so as to generate a voltage sufficient to drive an external load.

However, there is a considerable difference between a load output voltage, in which a load of the fuel cell stack is applied, and a no-load output voltage, from which the load is removed, i.e., an open circuit voltage (OCV).

For example, in the case of a fuel cell stack in which thirty unit cells having a load output voltage of 0.4 V and a no-load output voltage of 0.7 V are stacked, the total load output voltage is 12 V and the total no-load output voltage is 21 V.

Accordingly, the electric power generated in the fuel cell stack is suitably set to an appropriate level by passing through a DC/DC converter, which is a kind of output circuit, and then supplied to the load. If the electrical connection between the fuel cell stack and the load is suddenly cut off intentionally or unintentionally, the fuel cell stack is preferably driven in a no-load state, and thus the output voltage of 12 V is increased to 21 V.

Accordingly, if the electrical connection between the fuel cell stack and the load is artificially cut off, hydrogen peroxide is generated by the no-load output voltage in the MEA, and the hydrogen peroxide considerably reduces the durability of the MEA.

Moreover, in the case where the electrical connection between the fuel cell stack and the load is artificially cut off, component elements of the DC/DC converter may be damaged if they do not have a capacity sufficient to withstand the no-load output voltage.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In one aspect, the present invention provides a current collector of an end plate for a fuel cell and a method for controlling the same, in which a plurality of current collector plates having different resistance values is preferably mounted on an end plate so that a current collector plate formed of a material having a minimum resistance is suitably selected in a normal state to discharge electric power to a load and a current collector plate formed of a material having a large resistance is preferably selected, in a case where it is necessary to generate heat from a fuel cell during cold start, to perform a self-discharge mode in which the current of a fuel cell stack is discharged through the selected current collector plate, thus improving cold startability.

The present invention provides a current collector of an end plate for a fuel cell and a method for controlling the same, in which a self-discharge mode is preferably performed during low power operation such as idle or regenerative braking so that the current of a fuel cell stack is suitably consumed by a current collector plate having a large resistance, thus preventing the durability of a membrane electrode assembly (MEA) from being deteriorated by an open circuit voltage (OCV) generated when an electrical connection between a fuel cell and a load is artificially cut off to improve fuel efficiency.

In one preferred embodiment, the present invention provides a current collector of an end plate for a fuel cell, the current collector preferably comprising an insulating plate attached to the inside of an end plate connected to both ends of a fuel cell stack; a plurality of current collector plates having suitably different resistance values and insulatedly stacked on the inside of each of the end plates; and an electrode integrally connected to each of the current collector plates and extending to the outside of the end plates.

In a preferred embodiment, a first current collector plate having a resistance (R=Vmax/Imin) with respect to a maximum voltage (Vmax) and a minimum current (Imin), which does not suitably reduce the durability of a membrane electrode assembly, is preferably attached to the insulating plate attached to the inside of the end plate, a second current collector plate having a minimum resistance characteristic is preferably attached to the inside of the first current collector plate with an insulating material suitably interposed therebetween, and first and second electrodes are formed to extend from the first and second current collector plates to the outside of the end plates.

In another preferred embodiment, a selection switch for switching the operation of a fuel cell to a normal mode or a self-discharge mode is suitably connected to the first and second electrodes, and a controller is suitably connected to the selection switch to control the switching operation to the normal mode or the self-discharge mode.

In another aspect, the present invention provides a method for controlling a current collector of an end plate for a fuel cell, the method preferably comprising detecting an outside air temperature; switching a selection switch to a self-discharge mode based on a suitable control command of a controller so that the current of a fuel cell is discharged, if the outside air temperature is suitably lower than a cold start temperature; and switching the selection switch to a normal mode based on a suitable control command of the controller so that a fuel cell stack operates in a normal mode, if the temperature of the fuel cell is increased above a critical lower temperature of the normal mode.

In still another aspect, the present invention provides a method for controlling a current collector of an end plate for a fuel cell, the method preferably comprising determining whether idle or regenerative braking is performed; suitably switching a selection switch to a self-discharge mode based on a control command of a controller so that the current of a fuel cell is suitably discharged, if the voltage of a fuel cell stack is greater than a critical upper voltage of a normal mode during idle or regenerative braking; and preferably switching the selection switch to the normal mode based on a control command of the controller so that the fuel cell stack operates in the normal mode, if the voltage of the fuel cell stack is equal to or smaller than a critical upper voltage of the normal mode.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
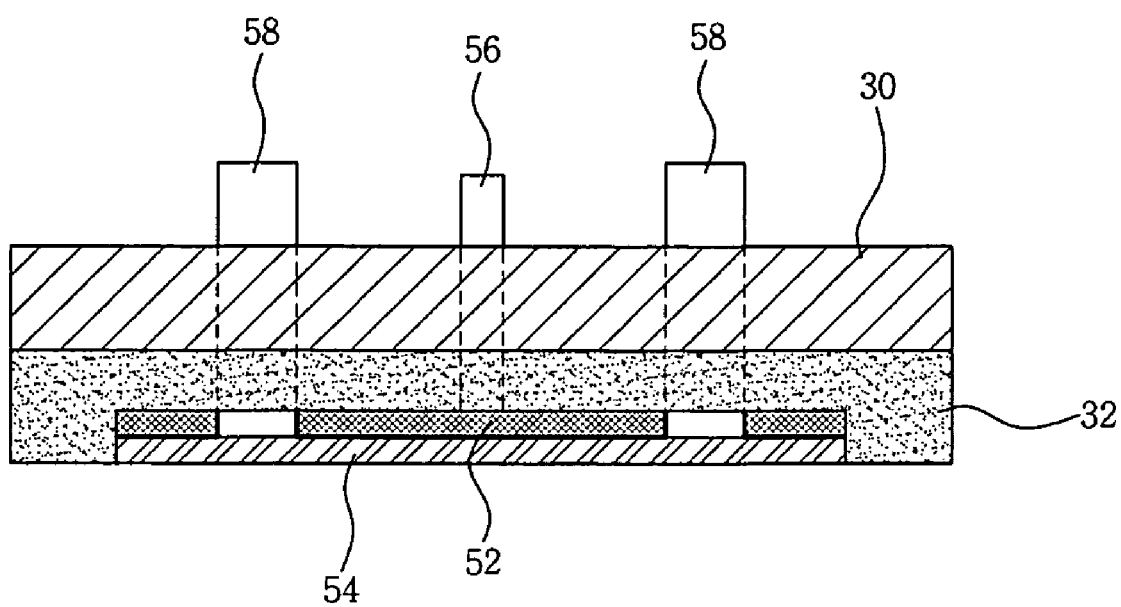
FIG. 1 is a schematic diagram showing a current collector of an end plate for a fuel cell in accordance with an exemplary embodiment of the present invention.

Reference numerals set forth in the Drawings includes reference to the following elements as further discussed below:

| | |
|---|---|
| 10: electrolyte membrane | 12: cathode |
| 14: anode | 16: gas diffusion layer |
| 18: gasket | 20: bipolar plate |
| 30: end plate | 32: insulating plate |
| 34: current collector | 40: load |
| 52: first current collector plate | 54: second current collector plate |
| 56: first electrode | 58: second electrode |
| 60: selection switch | 70: controller |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a current collector of an end plate for a fuel cell, the current collector comprising an insulating plate, a plurality of current collector plates, and an electrode.

In one embodiment, the insulating plate is attached to the inside of an end plate that is connected to both ends of a fuel cell stack.

In another embodiment, the plurality of current collector plates have different resistance values and are insulatedly stacked on the inside of each of the end plates.

In another further embodiment, the electrode is integrally connected to each of the current collector plates and extends to the outside of the end plates.

In another aspect, the invention features a method for controlling a current collector of an end plate for a fuel cell, the method comprising detecting an outside air temperature, switching a selection switch to a self-discharge mode based on a control command of a controller so that the current of a fuel cell is discharged, and switching the selection switch to a normal mode based on a control command of the controller so that a fuel cell stack operates in a normal mode.

In one embodiment, the step of switching the selection switch to a self-discharge mode is carried out if the outside air temperature is lower than a cold start temperature.

In another embodiment, the step of switching the selection switch to a normal mode is carried out if the temperature of the fuel cell is increased above a critical lower temperature of the normal mode.

In another aspect, the invention features a method for controlling a current collector of an end plate for a fuel cell, the method comprising determining whether idle or regenerative braking is performed, switching a selection switch to a self-discharge mode based on a control command of a controller so that the current of a fuel cell is discharged, and switching the selection switch to the normal mode based on a control command of the controller so that the fuel cell stack operates in the normal mode.

In one embodiment, the step of switching the selection switch to a self-discharge mode is carried out if the voltage of a fuel cell stack is greater than a critical upper voltage of a normal mode during idle or regenerative braking.

In another embodiment, the step of switching the selection switch to the normal mode is carried out if the voltage of the fuel cell stack is equal to or smaller than a critical upper voltage of the normal mode.

Also featured in the invention is a motor vehicle that comprises the current collector of an end plate for a fuel cell of any of the aspects or embodiments as described herein.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
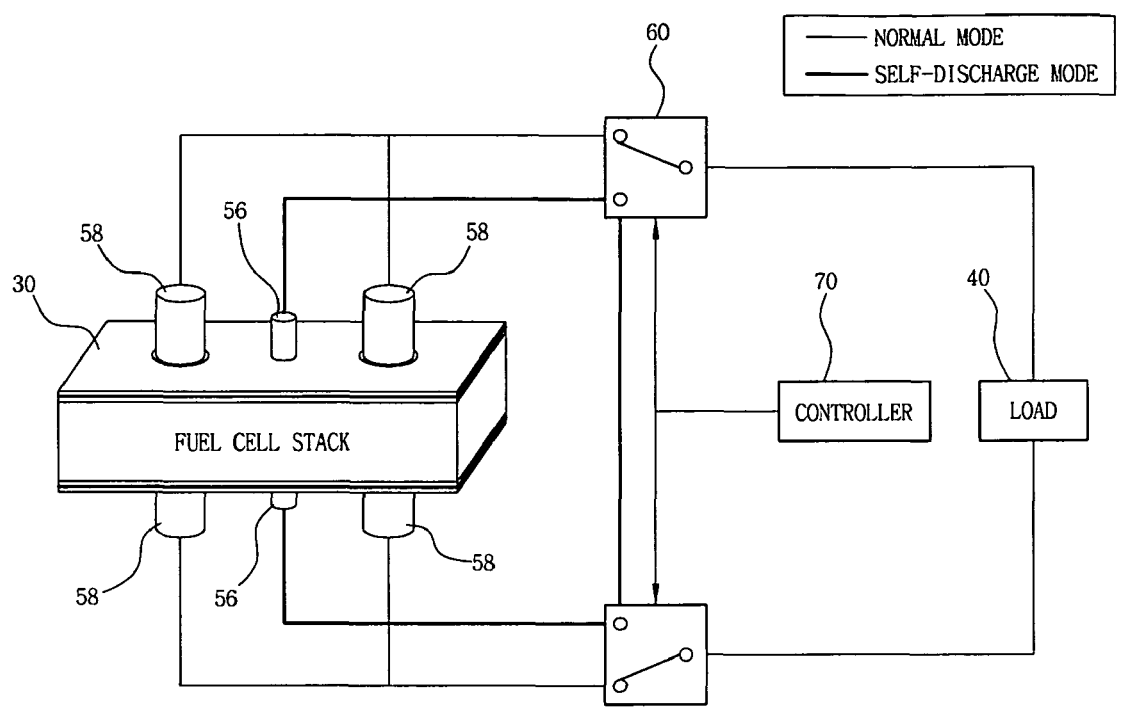
FIG. 2 is a circuit diagram for a normal mode and a self-discharge mode of the current collector of an end plate for a fuel cell in accordance with the present invention.

FIG. 1 is a schematic diagram showing a current collector of an end plate for a fuel cell in accordance with an exemplary embodiment of the present invention, and FIG. 2 is a circuit diagram for a normal mode and a self-discharge mode of the current collector of an end plate for a fuel cell in accordance with preferred embodiments of the present invention.

preferably, electrical energy generated in a fuel cell stack is supplied to various loads that require electricity through a current collector constructed in an end plate.

The current collector in accordance with preferred embodiments of the present invention is mounted on the inside of each of the end plates connected to both ends of the fuel cell stack and has a characteristic feature in that a plurality of current collector plates having different resistance values is stacked on the end plates.

More particularly, in further preferred embodiments, an insulating plate 32 is suitably attached to the inside of each of the end plates 30, and a plurality of current collector plates 52 and 54 having different resistance values are insulatedly stacked on the inside of the insulating plate 32.

In further embodiments, electrodes 56 and 58 are integrally formed with the stacked current collector plates 52 and 54 and suitably extend to the outside through the insulating plate 32 and the end plate 30.

In certain embodiments, although a plurality of current collector plates having different resistance values may be stacked in accordance with the design of the fuel cell stack and its components elements, the current collector plates will be described with reference to a first current collector plate 52 and a second current collector plate 54 for a better understanding of the present invention.

In certain preferred embodiments, the first current collector plate 52 formed of a material having a large resistance, i.e., having a resistance (R=Vmax/Imin) with respect to a maximum voltage (Vmax) and a minimum current (Imin), is suitably attached to the insulating plate 32 mounted on the inside of the end plate 30, and a first electrode 56 integrally connected to the first current collector plate 52 extends to the outside through the end plate 30.

In further embodiments, the second current collector plate 54 formed of a material having a minimum resistance characteristic is insulatedly attached to the inside of the first current collector plate 52, and a second electrode 58 that is preferably integrally connected to the second current collector plate 52 and suitably extends to the outside through the first current collector plate 52 and the end plate 30.

According to further embodiments, a selection switch 60 for switching the fuel cell to a normal mode or a self-discharge mode is suitably connected to the electrodes extending to the outside of the end plate 30, i.e., to the first electrode 56 of the first current collector plate 52 and the second electrode 58 of the second current collector plate 54.

Preferably, a controller 70 is suitably connected to the selection switch 60 to control the switching operation of the selection switch 60.

The operation of the current collector of the end plate constructed based on the above structure and a method for controlling the same according to preferred embodiments of the invention will be described.

In certain preferred embodiments, the invention features a control process during cold start of the fuel cell as described herein.

Figure 3:
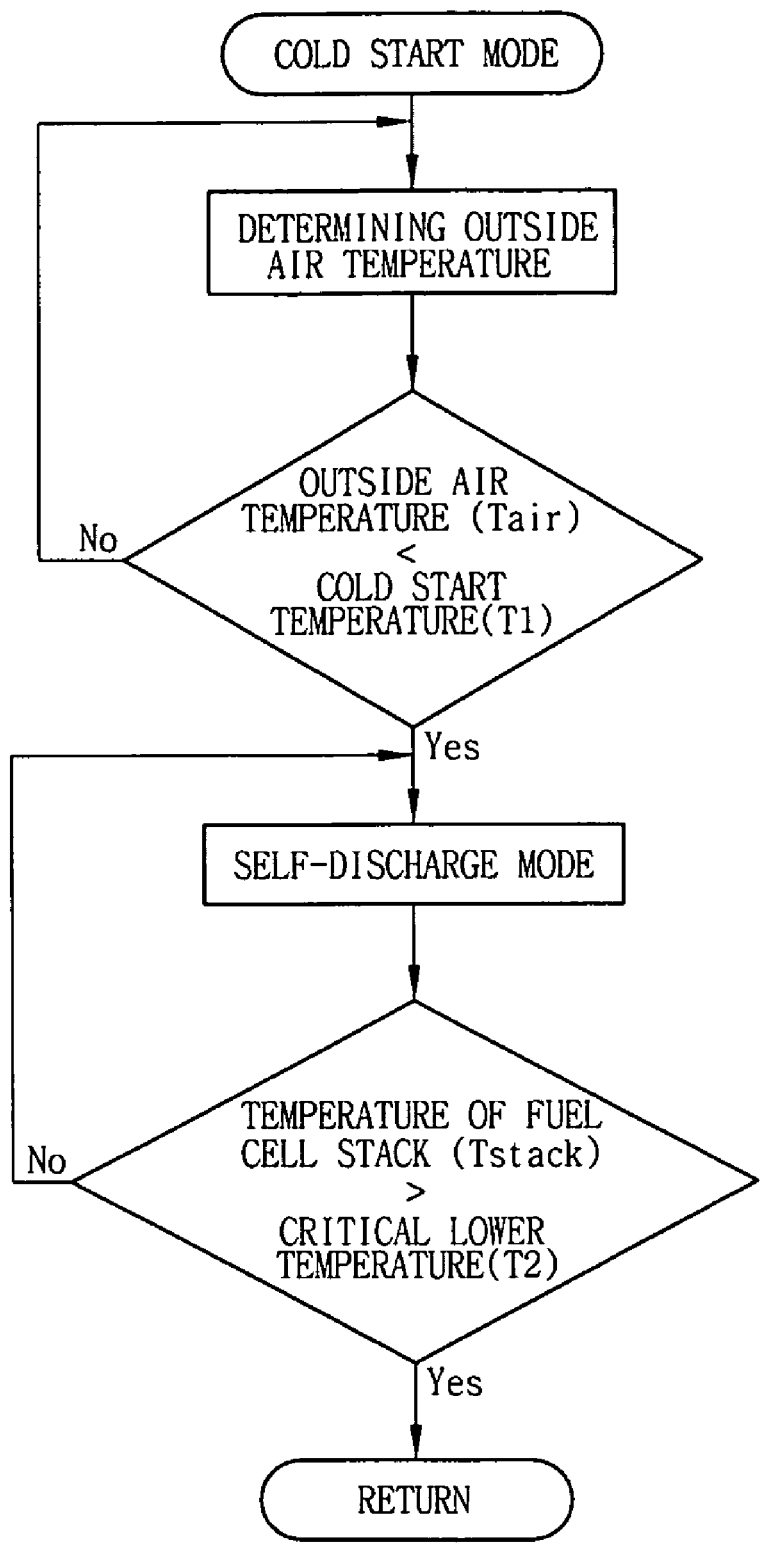
FIGS. 3 and 4 are flowcharts illustrating methods for controlling the current collector of an end plate for a fuel cell in accordance with the present invention.

FIG. 3 is a flowchart illustrating an exemplary method for controlling the current collector of an end plate for a fuel cell in accordance with preferred embodiments of the present invention, in which the control operation during cold start of the fuel cell is shown.

First, an outside air temperature Tair is detected and the detected value is input to the controller 70.

In further embodiments, if the controller 70 suitably determines that the outside air temperature Tair is lower than a cold start temperature T1, that is, if it is determined that the cold start condition of the fuel cell is suitably satisfied, the selection switch 60 is preferably switched to the self-discharge mode based on a control command of the controller 70.

As a result, the current of the fuel cell (i.e., open circuit voltage corresponding to a no-load output voltage) is suitably discharged along a current flow line of the self-discharge mode shown by a thick solid line in FIG. 2 until the normal mode of the fuel cell.

In certain preferred embodiments of the invention as described herein, the current of the fuel cell is suitably discharged along a circuit preferably consisting of the first current collector plate 52 attached to the end plate 30 at one side of the fuel cell stack with the insulating plate 32 interposed therebetween, the first electrode 56, the selection switch 60, and the first current collector plate 52 suitably attached to the end plate 30 at the other side of the fuel cell stack with the insulating plate 32 suitably interposed therebetween.

In further embodiments, if the controller 70 suitably determines that the temperature Tstack of the fuel cell stack is increased above a critical lower temperature T2 of the normal mode, that is, if it is determined that the temperature Tstack of the fuel cell stack is within the temperature range where the fuel cell stack operates in the normal mode, the selection switch 60 is suitably switched to the normal mode based on a control command of the controller 70.

Preferably, the electrical energy generated in the fuel cell stack is normally discharged and supplied to a load 40 that requires electricity along a current flow line of the normal mode shown by a thin solid line in FIG. 2, i.e., along a circuit consisting of the second current collector plate 54 suitably attached to the first current collector plate 52 on the end plate 30 at one side of the fuel cell stack, the second electrode 58, the selection switch 60, and the second current collector plate 54 suitably attached to the first current collector plate 52 on the end plate 30 at the other side of the fuel cell stack.

As described herein, in certain preferred embodiments, for example where it is preferable to generate heat from the fuel cell during cold start, the current of the fuel cell stack is suitably discharged through the first current collector plate having a large resistance so that the temperature of the fuel cell stack is rapidly increased to a normal level during cold start. Thus, according to exemplary embodiments, it is possible to improve cold startability with a suitable reduction in the start-up time. According to further embodiments, it is possible to reduce voltage variation before and after the cold start of the fuel cell stack, thus suitably ensuring stable power generation.

A control process during low power operation of the fuel cell according to preferred embodiments of the invention is described herein.

Figure 4:
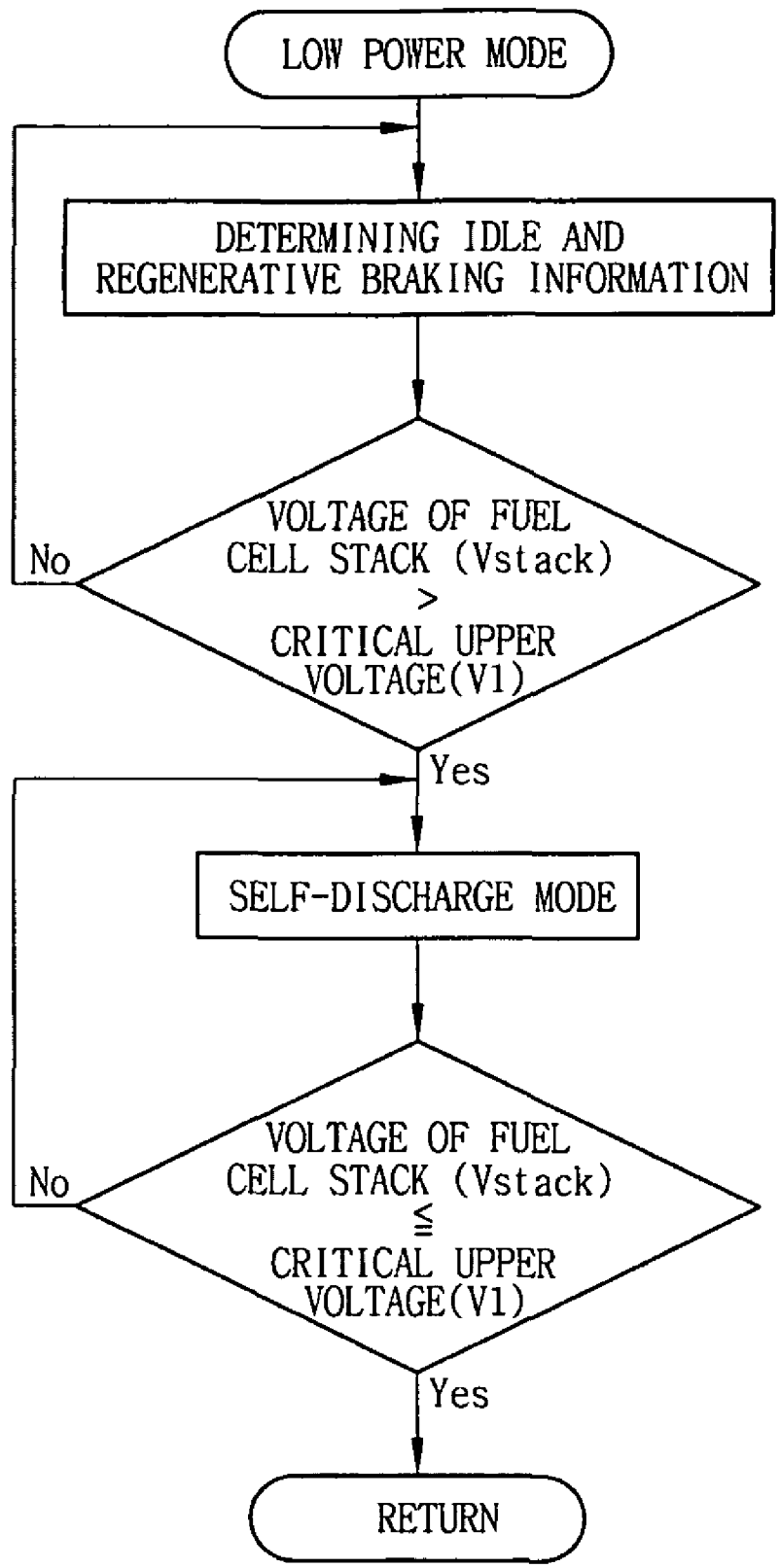
Figure 5:
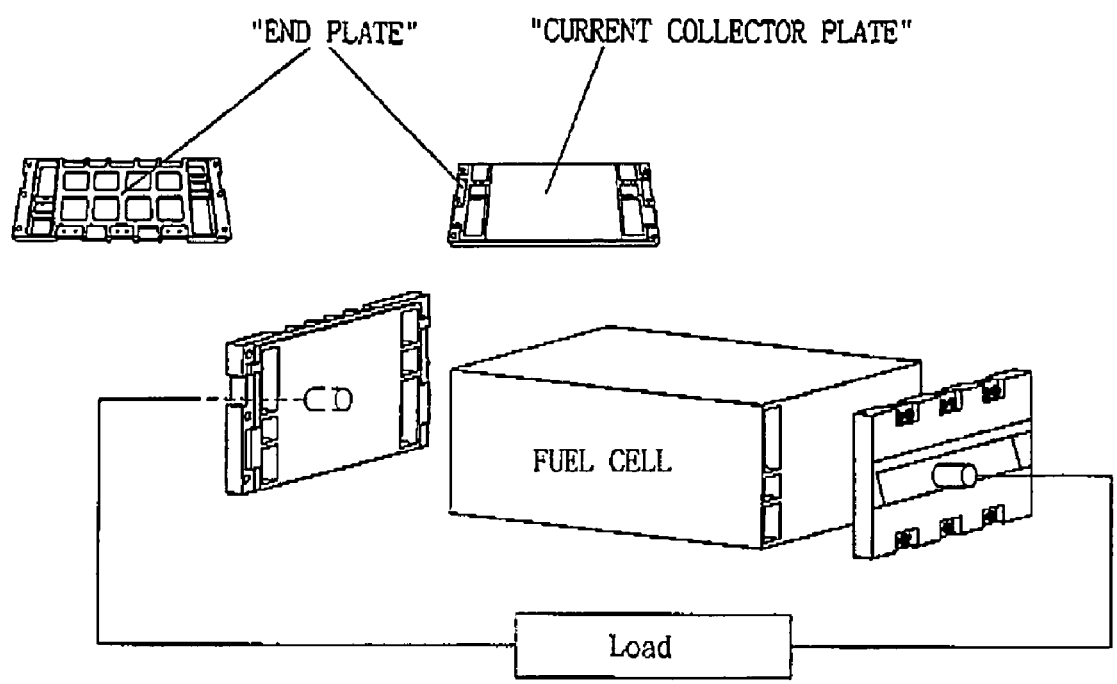
FIGS. 5 and 6 are schematic diagrams showing a structure of a fuel cell stack.
Figure 6:
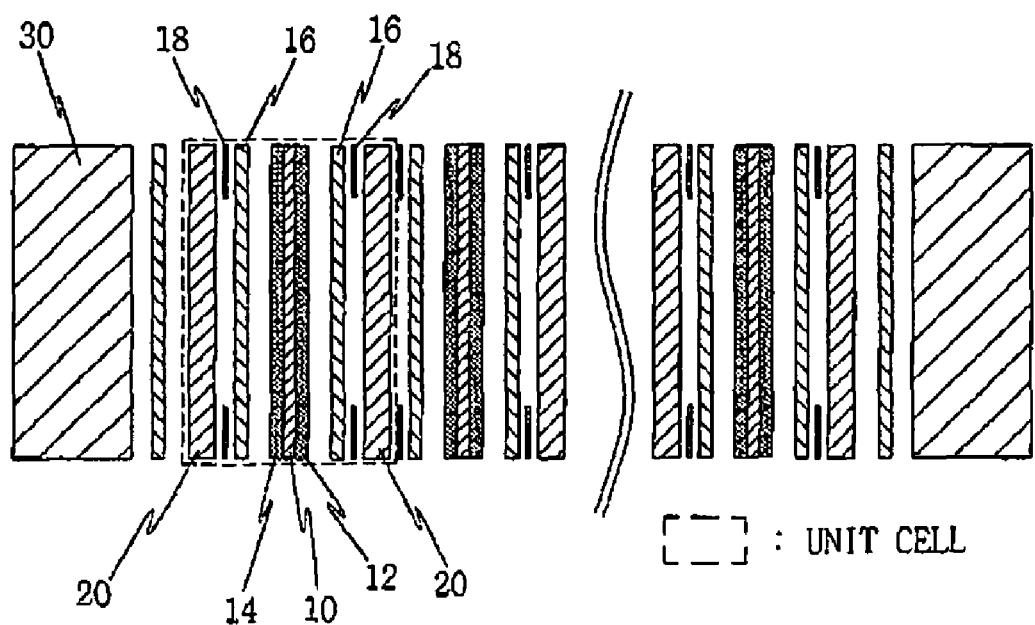
Figure 7:
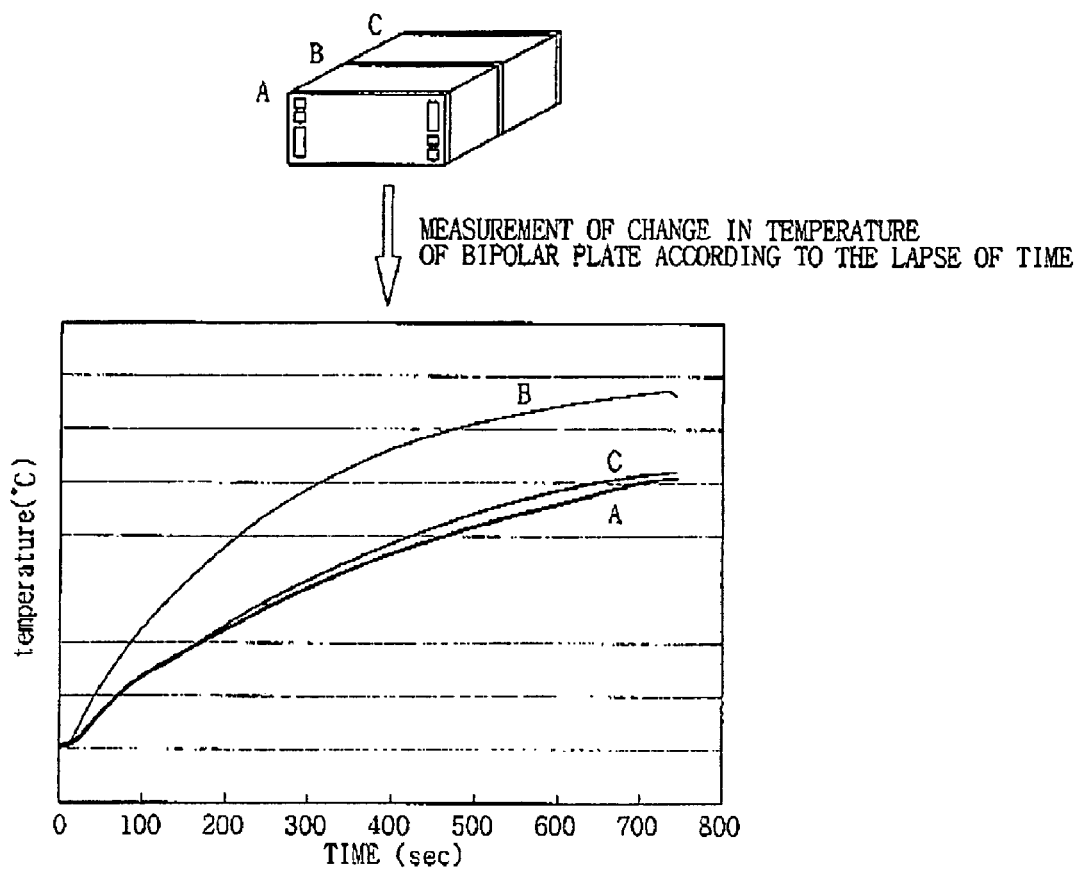
FIG. 7 is a graph illustrating temperature distribution of a bipolar plate during cold start of the fuel cell stack.
Figure 8:
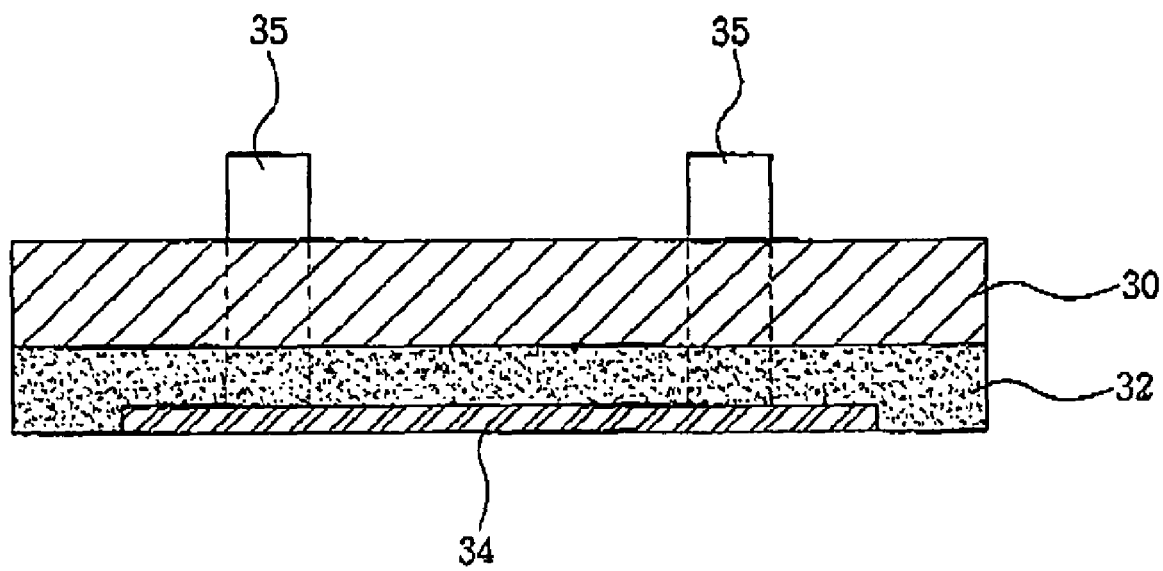
FIG. 8 is a schematic diagram illustrating a conventional current collector of an end plate assembly.

FIG. 4 is a flowchart illustrating a method for controlling the current collector of an end plate for a fuel cell in accordance with the present invention, in which the control operation during low power operation of the fuel cell is shown.

According to preferred embodiments of the invention, first, information regarding idle or regenerative braking is suitably input from a superior controller to the controller 70.

Subsequently, in further embodiments, during idle or regenerative braking, if the controller 70 determines that the voltage of the fuel cell stack is suitably greater than a critical upper voltage V1 of the normal mode, the selection switch 60 is switched to the self-discharge mode based on a control command of the controller 70, and thus the current of the fuel cell stack is suitably discharged.

According to certain exemplary embodiments, the current of the fuel cell (i.e., open circuit voltage corresponding to a no-load output voltage) is suitably discharged along the current flow line of the self-discharge mode shown by the thick solid line in FIG. 2 until the normal mode of the fuel cell.

Preferably, in further embodiments, the current of the fuel cell is suitably discharged along the circuit consisting of the first current collector plate 52 attached to the end plate 30 at one side of the fuel cell stack with the insulating plate 32 interposed therebetween, the first electrode 56, the selection switch 60, and the first current collector plate 52 attached to the end plate 30 at the other side of the fuel cell stack with the insulating plate 32 suitably interposed therebetween.

preferably, if the controller 70 suitably determines that the voltage of the fuel cell stack is equal to or smaller than the critical upper voltage V1, the selection switch 60 is suitably switched to the normal mode based on a control command of the controller 70, and thus the voltage of the fuel cell stack is normally discharged.

In certain exemplary embodiments, the electrical energy generated in the fuel cell stack is normally discharged and supplied to the load 40 that requires electricity along the current flow line of the normal mode shown by the thin solid line in FIG. 2, i.e., along the circuit preferably consisting of the second current collector plate 54 attached to the first current collector plate 52 on the end plate 30 at one side of the fuel cell stack, the second electrode 58, the selection switch 60, and the second current collector plate 54 attached to the first current collector plate 52 on the end plate 30 at the other side of the fuel cell stack.

As described herein, preferably during the low power operation such as idle or regenerative braking, the current of the fuel cell stack (e.g., current according to the OCV) is suitably consumed by the first current collector plate having a large resistance. Accordingly, it is possible to prevent the durability of the MEA from being deteriorated by hydrogen peroxide generated by the no-load output voltage (e.g., current according to the OCV), for example, where the electrical connection between the fuel cell and the load is artificially cut off to improve fuel efficiency.

As described above, the present invention provides the following effects.

According to preferred embodiments of the present invention, a plurality of current collector plates having different resistance values is suitably mounted on an end plate so that a current collector plate formed of a material having a suitably minimum resistance is selected in a normal state to discharge electric power to a load and a current collector plate formed of a material having a suitably large resistance is selected, in a case where it is necessary to generate heat from a fuel cell during cold start, to perform a self-discharge mode in which the current of a fuel cell stack is discharged through the selected current collector plate. Accordingly, in preferred embodiments, the temperature of the fuel cell stack is rapidly increased to a normal level during cold start, and it is thus possible to suitably improve cold startability with a reduction in the start-up time. Preferably, it is possible to reduce voltage variation before and after the cold start of the fuel cell stack, thus suitably ensuring stable power generation.

According to preferred embodiments of the present invention, the current of the fuel cell stack (e.g., OCV) is consumed by a current collector plate having a suitably large resistance during low power operation such as idle or regenerative braking, thus preventing the durability of a membrane electrode assembly (MEA) from being deteriorated by an open circuit voltage (OCV) generated when an electrical connection between a fuel cell and a load is artificially cut off to suitably improve fuel efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A current collector of an end plate for a fuel cell, the current collector comprising:
    an insulating plate attached to the inside of an end plate connected to both ends of a fuel cell stack;
    a plurality of current collector plates having different resistance values and stacked on the inside of the insulating plate;
    an electrode integrally connected to each of the current collector plates and extending to the outside of the end plates.

2. The current collector of claim 1, wherein a first current collector plate having a resistance (R=Vmax/Imin) with respect to a maximum voltage (Vmax) and a minimum current (Imin), which does not reduce the durability of a membrane electrode assembly, is attached to the insulating plate attached to the inside of the end plate, a second current collector plate having a minimum resistance characteristic is attached to the inside of the first current collector plate with an insulating material interposed therebetween, and first and second electrodes are formed to extend from the first and second current collector plates to the outside of the end plates.

3. The current collector of claim 2, wherein a selection switch for switching the operation of a fuel cell to a normal mode or a self-discharge mode is connected to the first and second electrodes, and a controller is connected to the selection switch to control the switching operation to the normal mode or the self-discharge mode.

4. A motor vehicle comprising the current collector of an end plate for a fuel cell of claim 1.

* * * * *